United States Patent [19]

Daggett et al.

[11] Patent Number: 5,144,211
[45] Date of Patent: Sep. 1, 1992

[54] MULTIAXIS ROBOT CONTROLLER HAVING WORKPOINT TORQUE CONTROL

[75] Inventors: Kenneth E. Daggett, Murrysville; Eimei M. Onaga, Blawnox, both of Pa.

[73] Assignee: Stäubli International Ag, Switzerland

[21] Appl. No.: 304,973

[22] Filed: Jan. 31, 1989

[51] Int. Cl.$^5$ ............................................. B25J 9/18
[52] U.S. Cl. .............................................. 318/568.11
[58] Field of Search ................. 318/568.11, 568.18, 318/568.1, 625; 901/15

[56] References Cited

U.S. PATENT DOCUMENTS

4,712,052 12/1987 Omae et al. ..................... 318/625
4,829,219 5/1989 Penkar ............................ 318/568.18

Primary Examiner—William M. Shoop, Jr.
Attorney, Agent, or Firm—Fitch, Even, Tabin & Flannery

[57] ABSTRACT

Workpoint torque control is employed in an electron multiaxis robot controller. Robot axis torque is determined from axis motor current feedback. Axis torque requests are based on torque command and torque feedback in an axis torque control mode or on the basis of position, velocity and torque commands and position, velocity and torque feedback in a combined position/torque control mode, or an indirect torque control mode.

4 Claims, 7 Drawing Sheets

MULTIAXIS ROBOT CONTROLLER HAVING WORKPOINT TORQUE CONTROL

CROSS REFERENCE TO RELATED APPLICATIONS

The following patent applications relate to a digital multiaxis robot controller in which the present invention may be embodied and are hereby incorporated by reference:

U.S. Ser. No. 932,975, now continuation Ser. No. 180,719 filed Apr. 4, 1988 entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga, now U.S. Pat. No. 4,902,944.

U.S. Ser. No. 932,841, now continuation Ser. No. 07/231,627 filed Aug. 5, 1988 entitled DIGITAL ROBOT CONTROL HAVING AN IMPROVED PULSE WIDTH MODULATOR and filed by Kenneth E. Daggett.

U.S. Ser. No. 932,992 entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Ser. No. 932,976 entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 entitled BASIC DIGITAL MULTI-AXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Ser. No. 932,989 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 07/304,975 entitled DIGITAL ROBOT CONTROL HAVING PULSE WIDTH MODULATOR OPERABLE WITH REDUCED NOISE, K. E. Daggett, R. A. Johnson, L. C. Vercellotti, R. J. Casler, E. M. Onaga, L. L. Woodland, now U.S. Pat. No. 4,980,838.

U.S. Ser. No. 932,977, now continuation Ser. No. 180,601 filed Apr. 6, 1988 entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990, now continuation Ser. No. 180,723 filed Apr. 4, 1988 entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Ser. No. 932,986 entitled MULTIAXIS ROBOT HAVING IMPROVED MOTION CONTROL THROUGH VARIABLE ACCELERATION/DECELERATION PROFILING and filed by Rajan Penkar.

U.S. Ser. No. 932,988 entitled MULTIAXIS ROBOT CONTROL HAVING CAPABILITY FOR EXECUTING TIMED MOVES and filed by Rajan Penkar.

U.S. Ser. No. 932,985 entitled MULTIAXIS ROBOT CONTROL HAVING IMPROVED CONTINUOUS PATH OPERATION and filed by Rajan Penkar.

U.S. Ser. No. 932,840 entitled MULTIAXIS ROBOT CONTROL HAVING FITTED CURVED PATH CONTROL and filed by Rajan Penkar.

U.S. Ser. No. 932,973, now continuation Ser. No. 180,598 filed Apr. 6, 1988 entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Ser. No. 932,842 entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to industrial robots and more particularly to multiaxis electronic robot controllers having a capability for workpoint torque control.

In typical robot controllers, joint motor current and therefore workpoint torque are varied to satisfy robot position commands. Workpoint torque is accordingly varied as an intermediate variable to control workpoint position as an end controlled variable.

There are various robot applications where it is desirable or necessary that robot workpoint torque be controlled as end controlled variable. For example, because of possible small noncompliance between the robot reference axes and the external world reference axes, the actual workpoint position may need to be adjusted under direct torque control as opposed to position control to provide compliance with a position command and enable a task to be performed at the command position (such as inserting a bolt in a bolt hole at the command position).

As another example, it may be desirable to maintain torque along one world axis direction within a predefined range as robot arm endpoint motion occurs along another world axis. More generally, it is desirable that combined multiaxis workpoint torque and position control be provided for robot operations with arm dexterity control through the simultaneous control of robot arm endpoint position and torque as end controlled variables.

Some prior robot controllers have had the capability for providing control of workpoint torque as an end controlled variable. Since prior robot joint power amplifiers have typically been encased with the motor current loop control internalized within the power amplifier casing, workpoint torque control based on motor current feedback has generally not been possible.

Instead, force sensors mounted near the robot wrist have been used to generate feedback signals representing the physically sensed workpoint force. A higher level control loop in the robot controller in turn has processed the physical workpoint torque feedback signals to generate torque commands for the joint power amplifiers and thereby control the workpoint torque as an end controlled variable.

In general, the use of force sensors for workpoint torque control has provided accurate robot performance. However, combined robot workpoint torque and position control has generally not been possible and penalties have existed in the form of a higher pay load at the end of the robot arm and a relatively high cost especially for many robot applications classed as relatively simple.

With the development of a fully digital robot controller disclosed in the patent applications cross-referenced herein, joint motor current feedback signals are accessible for workpoint torque control. The present invention is directed to an improved robot controller in which workpoint torque is controlled as an end controlled variable as a function of motor current feedback.

SUMMARY OF THE INVENTION

An electronic control is provided for a robot having an end effector and having multiple axes each further having a joint drive motor supplied by a power amplifier.

Means are provided for generating a motor torque command and position and velocity for each axis. Position, velocity and current feedback signals are generated for each axis.

Motor torque requests are generated as a function of the motor torque command of any position and velocity errors. In alternative workpoint torque control, motor voltage requests are based on torque commands and current feedback. In combined or indirect workpoint control, motor voltage requests are based on torque, position and velocity commands and current, position and velocity feedback signals.

DESCRIPTION OF THE PREFERRED EMBODIMENT

Figure 1:
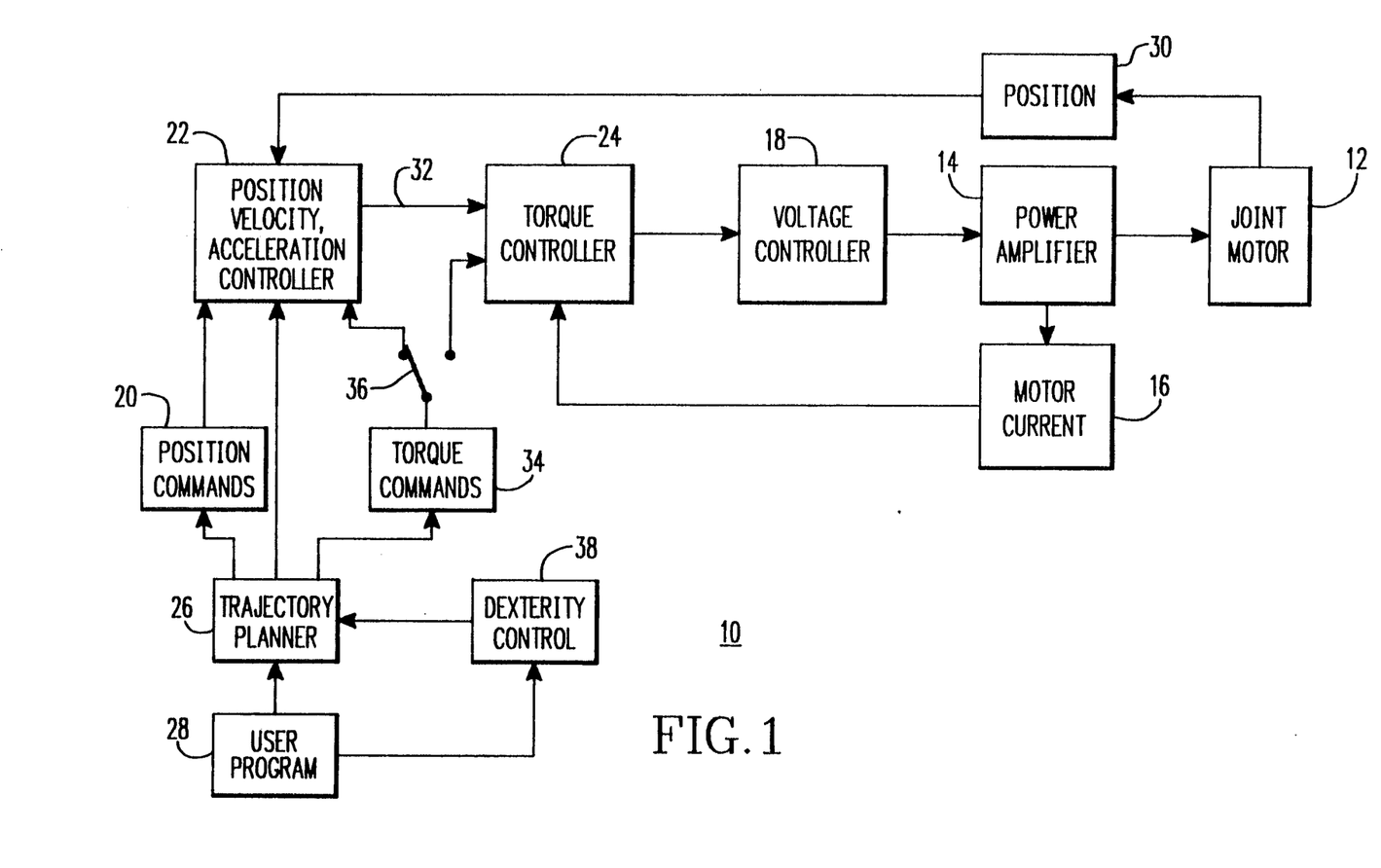
FIG. 1 shows a general block diagram for a robot controller having workpoint torque control in accordance with the present invention.

More particularly, there is shown in FIG. 1 a general block diagram for a robot axis control 10 employed to provide workpoint torque control for each of multiple axes of a robot in accordance with the present invention. A joint motor 12 for the robot axis provides the drive for joint movement under the control of a power amplifier 14. As shown, the power amplifier 14 is device like that described more fully subsequently herein and in greater detail in the cross-referenced patent application. Thus, joint motor current signals are accessible for higher level control use as indicated by the reference character 16.

The power amplifier in turn is operated by pulse width modulated signals generated by a voltage controller 18 and representing motor voltage requests based on higher level joint commands. Thus workpoint position commands 20 are applied to a position, velocity and acceleration controller 22 (implemented with a microprocessor on the subsequently considered SCM board). A torque request signal generated by the controller 22 is applied along with the motor current signal 16 to a torque controller 24 (microprocessor circuitry on a torque processor board) which generates voltage requests to the voltage controller 18 (PWM circuitry on an AIF board) on the basis of torque error.

A trajectory planner 26 generates the position commands 20 in response to a robot user's program 28. The controller 22 interpolates velocity and acceleration commands from the position commands and generates the torque requests as a function of the position, velocity and acceleration commands and motor position feedback signals 30. The planner 26 may be implemented in a microprocessor or an SCM board or a system board subsequently considered more fully herein.

The control elements 18, 22, and 26 can be embodied in hardware as more fully disclosed in the cross-referenced patent applications.

In a position control mode, the torque controller 24 receives torque requests from the position, velocity, and acceleration controller and current (torque) feedback signals 16 from the power amplifier 14. In this case, the robot control 10 is operated with joint and workpoint torque controlled as intermediate variables and joint and workpoint positions controlled as end controlled variables.

To enter an alternative torque control mode which can for example be used for compliance control, the trajectory planner 26 opens the position, velocity and acceleration control loops as represented by the dotted position of switch 32. In addition, the planner directs torque commands 34 generated by the user program 28 directly to the torque controller 24 as represented by the dotted position of switch 36. In the torque control mode, the joint and workpoint torques are controlled as end controlled variables.

In a torque limit control mode, motor current signals 16 are coupled directly to the trajectory planner 26 and user position commands are adjusted prior to application to the position, velocity and acceleration control 22 so as to satisfy workpoint-based axis torque limits and thus ultimately limits workpoint torque along one or more world axes.

In a robot dexterity control mode, a dexterity control 38 combines user torque and position commands to develop adjustments for the position commands normally generated by the trajectory planner 26 for execution by the robot control 10. The position command adjustments provide feedforward control action through the position, velocity and acceleration controller and thus provides for simultaneous control of workpoint position and workpoint torque as end controlled variables.

Figure 4A:
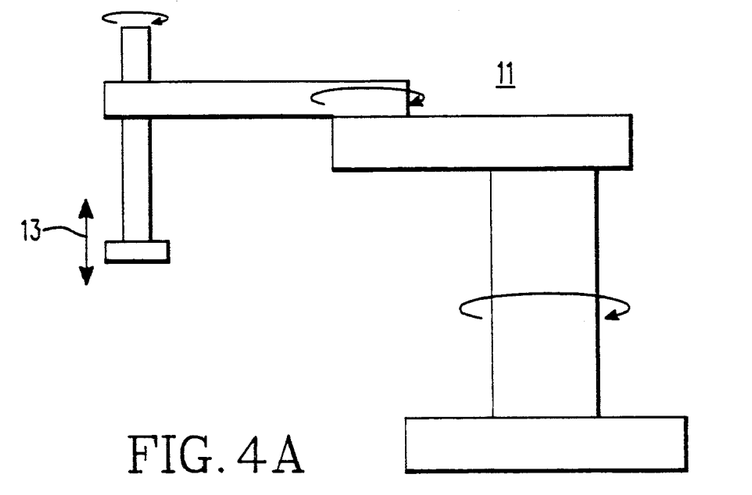
FIGS. 4A and 4B, respectively, show SCARA and gantry robot types in which torque control is readily implementable because of correspondence between at least one robot axis nd one world axis.
Figure 4B:
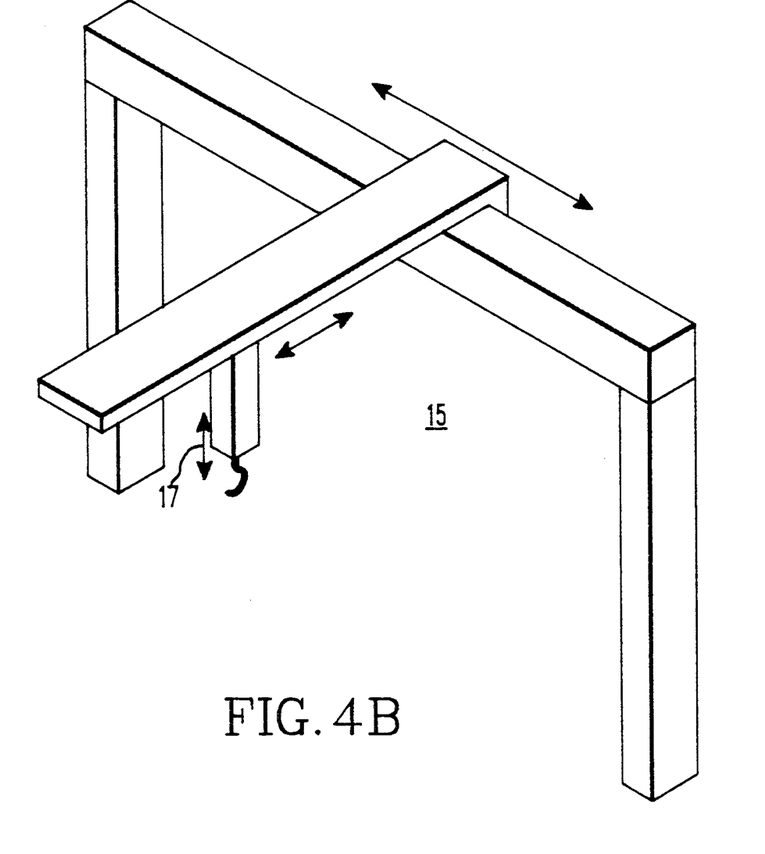

In FIG. 4A, there is shown a four axis SCARA type robot 11 in which robot axis 13 directly corresponds to a world axis such as the Z axis. Similar correspondence exists for robot axis 17 of a gantry type robot 15 shown in FIG. 4B. The robots 11 and 15 are especially suitable for implementation of the present invention because of the axis correspondence.

WORKPOINT TORQUE CONTROL LOOP CONFIGURATION

Figure 2:
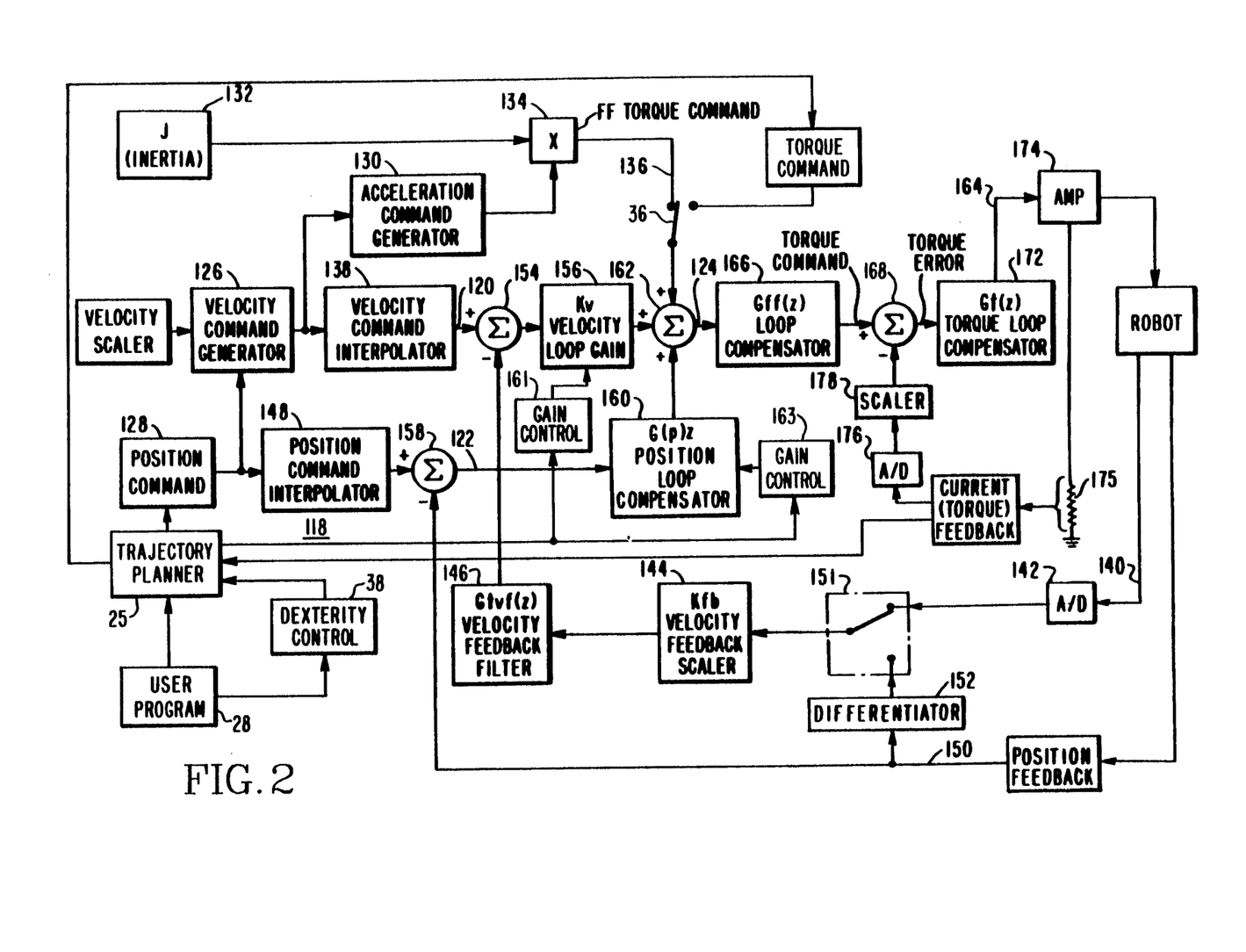
FIG. 2 shows a more detailed control diagram for the robot controller of FIG. 1.

The preferred generalized control loop configuration 10 for robotic workpoint torque control is shown in greater detail in FIG. 2. The robot control 10, at FIG. 1, is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 10, at FIG. 2, position and velocity control loops 120 and 122 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced control has a trajectory cycle of 8 milliseconds.

In any case, a velocity interpolator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 complete the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in and other cross-referenced patent applications.

Velocity error is generated by summer 154 with gain applied by loop 156. Similarly, position error is generated by summer 158 with gain applied by box 160.

Velocity and position errors and a feedforward acceleration command are summed in summer 162. Gain is applied to box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error and output commands (motor voltage commands) are applied to a power amplifier 174 which supplies the motor drive current for robot joint operation.

Current feedback from resistor 175 is generated every 250 microseconds (see cross-referenced patent application Ser. No. 932,975) and converted to digital signals by box 176 with scaling applied by box 178. If desired, adaptive feedforward torque control can be employed with omission of the feedforward acceleration command as more fully described in another copending application entitled "Robot Control System Having Adaptive Feedforward Torque Control For Improved Accuracy", filed by E. Onaga et al. on Mar. 21, 1988, now U.S. Pat. No. 4,925,312.

Workpoint torque control in the torque control mode implemented by the application of user torque commands from the user program 28 through the switch 36 to the summer where it is compared to the current feedback from the resistor 175 to develop a torque error signal for the torque controller. Concurrently, gain controls 161 and 163 are set to zero by the trajectory planner 26 so that the summer 168 operates to torque controller only in response to torque commands from the summer 162 through the box 166. When the torque control mode is ended and the switch 36 is reset to its normal position, torque commands are generated in the acceleration control loop. The more detailed configuration for the robot control 10 in FIG. 2 operates as previously described in the torque limit and dexterity control modes.

BOARD OVERVIEW

Implementation of the control looping for the robot control is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facility and universality of use, and flexibility in choice of level of control performance. Generally, circuitry on the electronic boards is like that disclosed in the cross-referenced applications and configuration of the circuitry for workpoint torque control is achieved through programs control.

Figure 3:
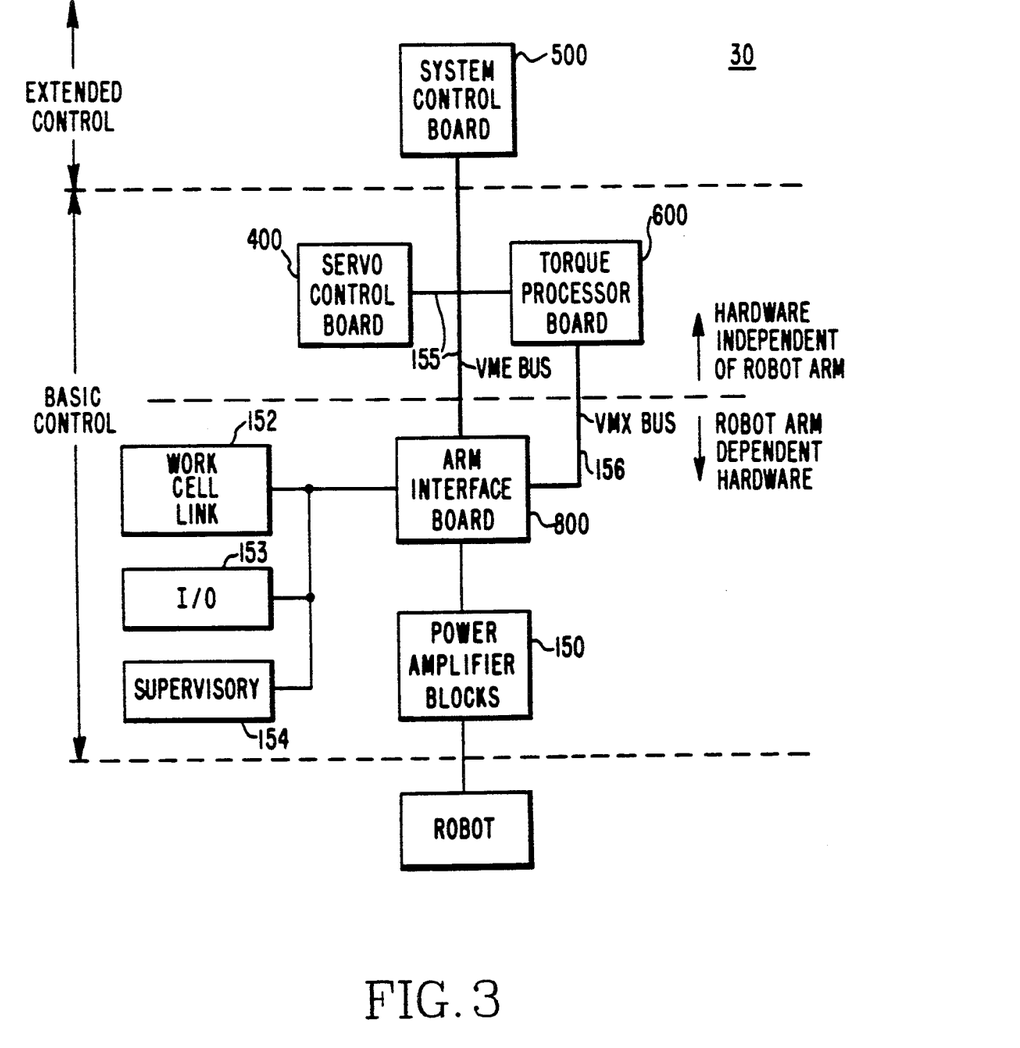
FIG. 3 shows an overview of an arrangement of electronic boards on which circuitry is arranged in accordance with the digital robot control disclosure in the cross-referenced patent applications and further highlighting robotic workpoint torque control looping system in accordance with the present invention.

As shown in FIG. 3, the control board configuration or network includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm. The AIF board 800 includes the voltage control 18 of FIG. 1.

The arm interface (AIF) 800 board also houses generic circuitry such as VME bus control circuitry which is generally related to two or more boards and not to any one board in a particular system.

Control signals (pulse width modulated) are generated from the AIF board 800 to control power blocks 150 which supply motor currents to the respective robot joint motors. The AIF board 800 also operates as a channel for external coupling of the robot control 30 to other robot controls in a work cell as indicate by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls.

The torque processor board 600 houses the torque controller 24, at FIG. 1, and thus provides motor torque control in response to torque commands from the servo control board 400. In turn, the servo control board 400 houses the trajectory planner 26, at FIG. 1, and the position, velocity and acceleration controller 22, at FIG. 1, and provides arms solutions and position and velocity control in accordance with the robot control program 28 (FIG. 1).

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 with significantly faster control action, i.e., with a trajectory cycle shortened from thirty-two milliseconds to eight milliseconds. Dexterity control 38 can also be partitioned to the system control board 500.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 2) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented elsewhere in the writeups for the cross-referenced patent applications.

ARM DRIVE CONTROL

As previously described, the higher level control looping generates voltage command signals to be executed through the AIF board 800 for the arm axes so that the arm effector is moved under either (1) controlled torque or (2) controlled position velocity, and acceleration or (3) controlled position velocity, acceleration and torque in accordance with a user's robot program. Generally, pulse width modulation circuitry and drive circuitry are provided on the AIF board 800 to develop axis drive signals, in this instance for application to power amplifiers which provide the drive currents to DC brushless electric motors respectively associated with the six axes of robot arm motion. With the employment of pulse width modulated digital control signals, the solid state switches that control the motor currents within the power amplifiers can be operated much more efficiently to control motor current levels through pulsating on/off control as opposed to continuous amplitude control.

Most PWM schemes use a constant frequency ramp. Generally, the PWM ramp can be generated, either with digital or analog circuitry. The PWM motor voltage request for the power amplifier bridge is represented as a value on the ramp; a zero PWM request typically corresponds to the midpoint of the ramp. Request levels above the midpoint are considered positive, and the magnitude above the midpoint determines the time that the associated power device in one leg of the power bridge is turned on. Correspondingly, request levels below the midpoint are considered negative, and the magnitude of the request level determines the time that the associated power device in the other leg of the power bridge is turned on. This type of operation is referred to as modulation around the ramp midpoint. More detail on the arm drive control is set forth in the cross-referenced patent applications especially Ser. No. 06/932,841 and Ser. No. 06/304,975.

H BRIDGE POWER AMPLIFIER - DC BRUSH TYPE MOTORS

An H bridge power amplifier or block 50 of the low cost hybrid type is shown in FIG. 5. One of the power blocks 50 provide motor drive current for each robot arm joint motor in DC brush type motors.

The power block 50 includes four semiconductor switches 51-A1, 51-A2, 51-B1 and 51-B2. Respective protective back voltage diodes 52 are connected across the respective semiconductor switches to permit the flow of regenerative or freewheeling currents when the switches 51-A1 and 51-B1 are turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a crosspath 55 of the H bridge circuit. When switches 51-A1 and 51-B2 are turned on, a positive voltage is applied across the motor 54 and current flows to the right in the crosspath 55 to drive the motor in the forward direction. With switches 51-B1 and 51-A2 turned on, current flows through the crosspath 55 in the opposite direction to drive the motor in the reverse direction. The digital pulses A1 and B1 precisely control the on time of the switches 51-A1 and 51-B1 respectively so as to produce the motor current needed to satisfy control commands. The pulses A2 and B2 control the on time of the switches 51-A2 and 51-B2 so that the B2 and A2 on times respectively embrace the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board 800 where it is processed for use in the current or torque control loop.

POWER AMPLIFIER FOR BRUSHLESS DC MOTORS

Figure 7A:
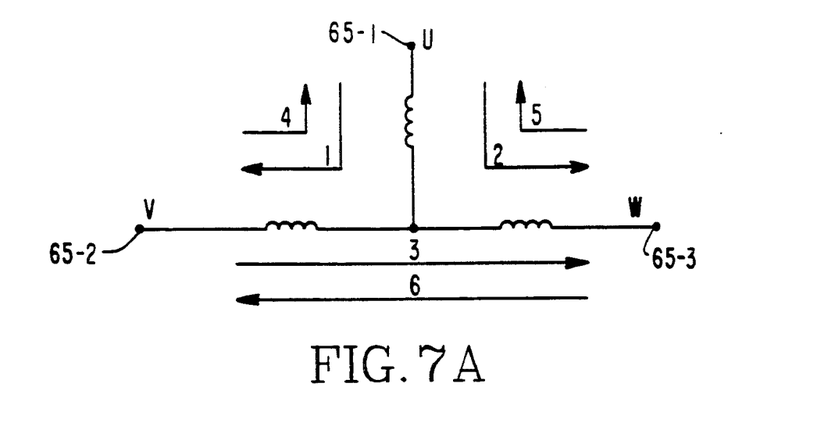
FIGS. 7A and 7B show a three-phase power amplifier circuit arranged to operate brushless DC motors in an alternative implementation of the present invention.

In FIG. 7A, there is shown the stator winding circuitry for DC brushless motors employed as axis drives in various robots including the Unimation 860 robot.

Figure 7B:
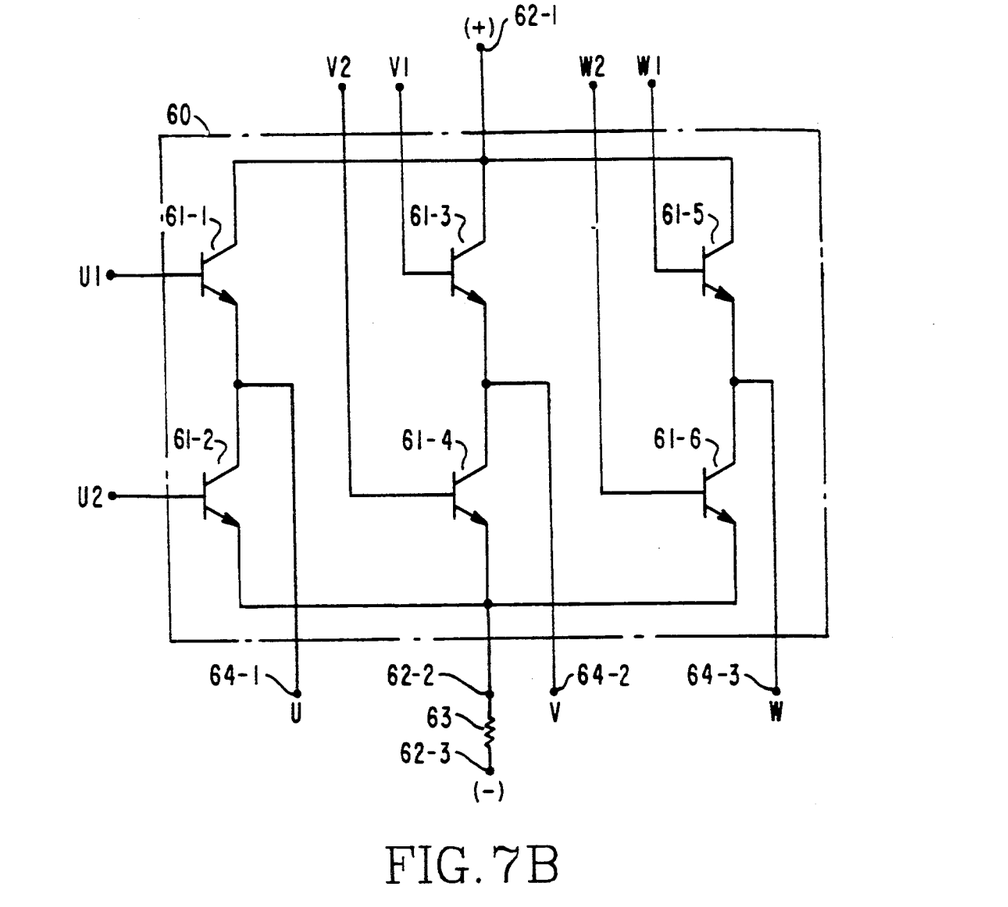

Power switch circuitry for the windings is shown in FIG. 7B. The switches are operated to direct current through two of the three windings at any one point in time, and the winding connection switching is rotated about the windings under PAL control. The effective magnitude of the motor current depends on the switch ON time which in turn is controlled by the PWM output. More detail on the generation of control pulses for the phase switches from the basic PWM switch control signals is set forth more fully in Ser. No. 932,974 entitled DIGITAL ROBOT CONTROL PROVIDING PULSE WIDTH MODULATION FOR A BRUSHLESS DC DRIVE, and filed by Kenneth E. Daggett et al. on Nov. 20, 1986.

A commercially available, low cost hybrid power amplifier block 60 (FIG. 7B) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in cross-referenced patent application 932,975.

The power amplifier block 60 additionally includes external terminals 64-1, 64-2 and 64-3 for respective connection to the free ends 65-1, 65-2 and 65-3 of the Y connected motor windings. External terminals 66-1 through 66-5 are also provided for application of the switch control signals U1 and U2, V1 and V2 and W1 and W2 from PWM commutation circuitry. To prevent power supply shorting and switch burnout, the power switches are always controlled so that only one switch can be on at a time in each of the respective paris of switches 61-1 and 61-3 and 4 and 61-5 and 6.

The control signals U1, V1 and W1 are the basic pulse width control signals that control the level of drive current through the motor windings. The control signals U2, V2 and W2 rotatively enable the six motor winding conduction paths and generally provide for the flow of freewheeling motor currents.

WORKPOINT TORQUE CONTROL APPLICATIONS

There are a great variety of ways in which workpoint torque control can be implemented in accordance with the invention.

Figure 5A:
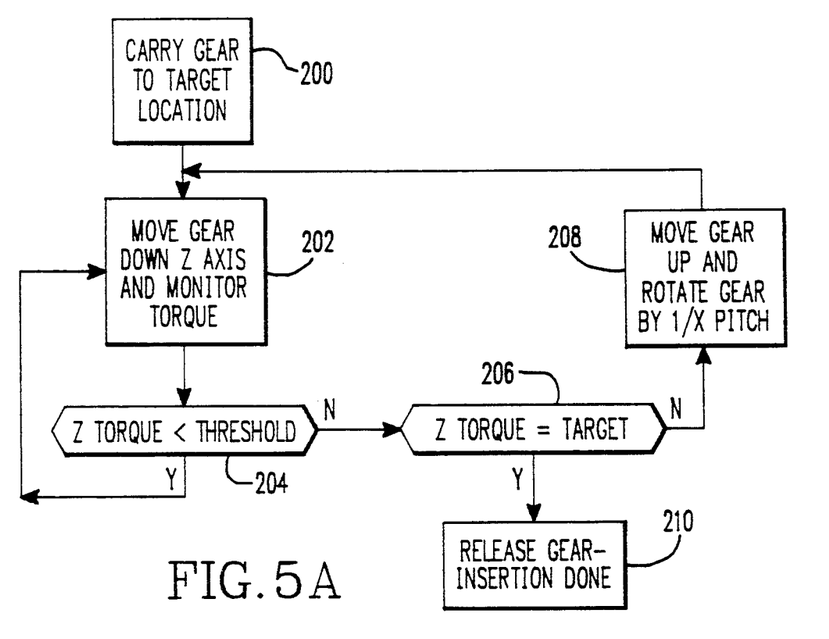
FIGS. 5A and 5B show respective flow diagrams for programming executed by board circuitry shown in FIG. 3 to implement workpoint torque control in respective representative applications of this invention.

In FIG. 5A, there is shown a flow chart representing cyclically executed programming for a first illustrative application in which a gear is moved to a location where it is to be placed in meshed relationship to a smaller gear. A robot like the SCARA type robot II of FIG. 4A may be employed for this purpose. The type of torque control involved here may be referred to as alternative axis torque control.

After the gear has been obtained by the robot arm, the multiple robot axes are controlled so that the robot end effector moves the gear to 1" above the predefined center of a small gear location as indicated by block 200. Once the gear is located above the target location, the robot arm slowly moves the gear downward along the world Z-axis as indicated by block 202. As downward movement occurs, Z-axis torque feedback is monitored.

If axis motor current feedback indicates that the Z-axis torque is less than the threshold value, block 204 returns the robot control system to block 202 for additional downward gear movement. When the torque is not less than the threshold value, block 206 determines whether the Z-axis torque is equal to the or greater than the target value.

If the torque is greater than the threshold value, it is presumed that the gear orientation does not permit meshing. Therefore, block 208 moves the gear upward on the Z-axis, rotates it by 1/X pitch and returns the robot control system to block 202 for another gear insertion attempt.

Once gear insertion results in the block 206 detection that the Z-torque equals the target torque value, block 210 then releases the gear in meshed relationship with the small gear and the insertion is done.

Figure 5B:
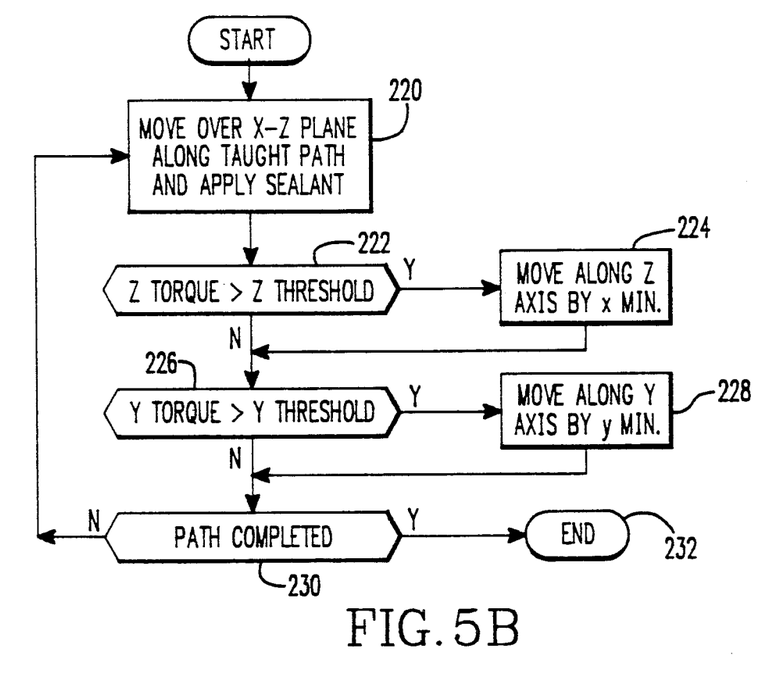
Figure 6:
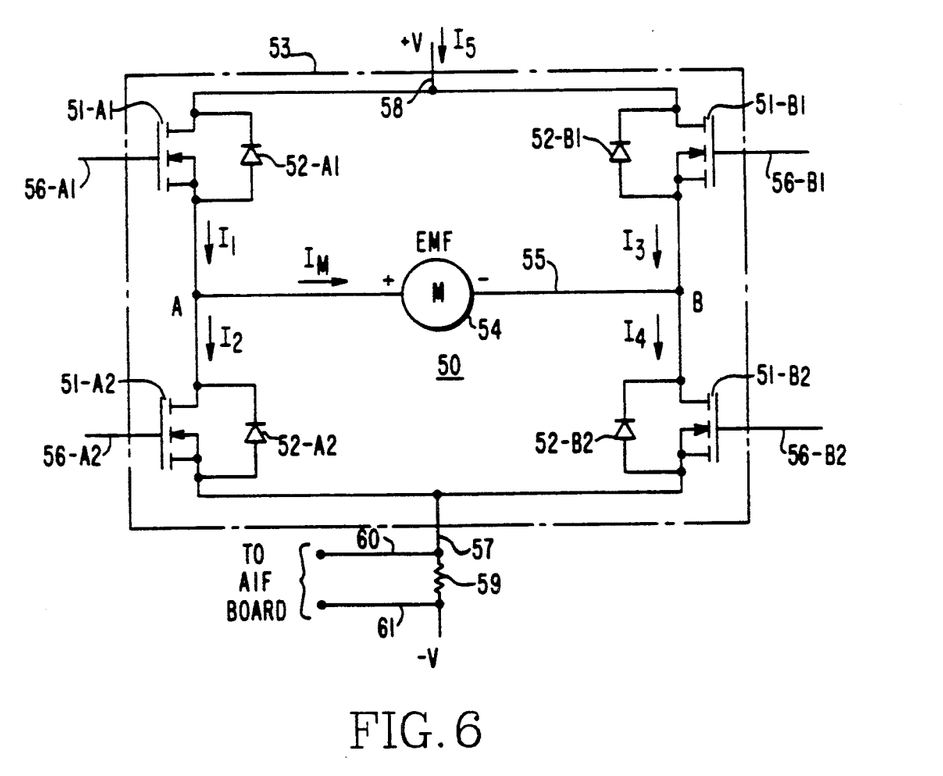
FIG. 6 shows an H bridge power amplifier circuit arranged to operate DC brush-type motors in implementing the present invention.

In FIG. 5B, there is illustrated another flow chart representing cyclically executed programming for another illustrative application of the invention in which sealant is to be applied to a workpiece along a pre-learned or otherwise predefined path. The multiple robot axes are controlled so that the robot end effector moves the sealant applicator along the taught path in the world X-Z plane as indicated by block 220. Sealant is applied as movement occurs over the taught sealant path. The type of torque control involved here may be referred to as indirect torque control, i.e. torque control implemented through position connections.

If axis motor current feedback indicates that the torque along the world Z-axis is greater than a Z-threshold value, block 224 initiates (through the position control) a move of predetermined value (X mm) along the Z-axis in the direction that will reduce the torque. Such Z-axis correction occurs on successive program cycles until the Z-torque is within this threshold value.

After the Z-torque check/correction by the block 222 or the blocks 222 and 224, a similar check/correction is made by blocks 226 and 228 for the work axis. If a Y-torque correction is required, the block 228 initiates a Y mm move along the Y-axis to a connective direction. As in the case of the Z-axis, connective Y moves are made on successive program executions until the Y-torque is below the threshold value.

After torque monitoring and connection in each program execution cycle, block 230 determines whether the path has been completed. If not, the program is returned for the next execution. If not, the program execution is ended as indicated by block 232.

What is claimed is:

1. An electronic control for a robot having end effector means and further having multiple axes each having a joint drive motor supplied by a power amplifier, said control comprising:
   means for generating position and velocity commands for each robot axis, thereby defining the operation of the robot end effector;
   means for generating position and velocity feedback signals for each robot axis;
   means for generating a motor torque command for each axis;
   means for generating a motor torque request for each axis as a function of position and velocity errors between command and feedback values and as a function of the motor torque command;
   means for generating a signal representing motor and current supplied by the power amplifier for each axis; and
   means for generating a voltage drive signal for each power amplifier as a function of any error between the torque request and the current feedback for the corresponding robot axis, said torque command generating means and said position command generating means are jointly implemented in trajectory planning means so that generated position commands reflect torque commands along the path of robot end effector motion.

2. An electronic control for a robot having end effector means and further having multiple axes each having a joint drive motor supplied by a power amplifier, said control comprising:
   means for generating position and velocity commands for each robot axis, thereby defining the operation of the robot and effector;
   means for generating position and velocity feedback signals for each robot axis;
   means for generating a motor torque command for each axis;
   means for generating a motor torque request for each axis as a function of position and velocity errors between command and feedback values and as a function of the motor torque command;
   means for generating a signal representing motor and current supplied by the power amplifier for each axis; and
   means for generating a voltage drive signal for each power amplifier as a function of any error between the torque request and the current feedback for the corresponding robot axis; wherein at least one robot world axis corresponds to one joint axis; and said motor torque request generating means functions only in response to said torque command generating means for said one axis when said one axis is placed in a workpoint torque control mode.

3. An electronic control for a robot having end effector means and further having multiple axes each having a joint drive motor supplied by a power amplifier, said control comprising:
   means for generating position and velocity commands for each robot axis, thereby defining the operation of the robot end effector;
   means for generating position and velocity feedback signals for each robot axis;
   means for generating a motor torque command for each axis;
   means for generating a motor torque request for each axis as a function of position and velocity errors between command and feedback values and as a function of the motor torque command;
   means for generating a signal representing motor and current supplied by the power amplifier for each axis; and
   means for generating a voltage drive signal for each power amplifier as a function of any error between the torque request and the current feedback for the corresponding robot axis;
   means for determining torque error along one or more torque controlled world axes as a function of the joint axes current feedback and torque commands for the torque controlled world axes; and
   means for initiating connective position moves through said position command generating means.

4. An electronic robot controller as set forth in claim 3, wherein the controlled path motion is over a world X-Z plane and the world Y and Z axes are torque controlled.

* * * * *

UNITED STATES PATENT AND TRADEMARK OFFICE
CERTIFICATE OF CORRECTION

PATENT NO. : 5,144,211

DATED : September 1, 1992

INVENTOR(S) : KENNETH E. DAGGETT et al.

It is certified that error appears in the above-identified patent and that said Letters Patent is hereby corrected as shown below:

Column 1, line 11, delete "now continuation" and substitute --(abandoned) continued as--.

Column 1, line 15, delete "and filed" and substitute --,--.

Column 1, line 19, delete "now continuation" and substitute --(abandoned) continued as--.

Column 1, line 22, delete "and filed" and substitute --,--.

Column 1, line 23, after "Daggett" insert --, now U.S. Patent No. 4,894,598--.

Column 1, line 24, before "entitled" insert --(abandoned), continued as Serial No. 180,703, filed November 20, 1986,--.

Column 1, line 27, delete "and filed" and substitute --,--.

Column 1, line 28, before "." insert --, now U.S. Patent No. 4,868,472--.

Column 1, line 31, delete "and filed" and substitute --,--.

Column 1, line 32, after "Onaga" insert --, now U.S. Patent No. 4,763,055--.

UNITED STATES PATENT AND TRADEMARK OFFICE
CERTIFICATE OF CORRECTION

PATENT NO. : 5,144,211            Sheet 2 of 6

DATED : September 1, 1992

INVENTOR(S) : KENNETH E. DAGGETT et al.

It is certified that error appears in the above-identified patent and that said Letters Patent is hereby corrected as shown below:

Column 1, line 33, before "entitled" insert --(abandoned), continued as Serial No. 178,813, filed April 1, 1988,--.

Column 1, line 35, delete "and filed" and substitute --,--.

Column 1, line 37, after "Casler" insert --, now U.S. Patent No. 4,874,997--.

Column 1, line 38, before "entitled" insert --(abandoned), continued as Serial No. 178,811, filed on April 1, 1988,--.

Column 1, line 40, delete "and filed" and substitute --,--.

Column 1, line 42, after "Onaga" insert --, now U.S. Patent No. 4,876,494--.

Column 1, line 43, before "entitled" insert --(abandoned) continued as Serial No. 871,668, filed on June 21, 1988,--.

Column 1, line 45, delete "and filed" and substitute --,--.

Column 1, line 46, after "Daggett" insert --, now U.S. Patent No. 4,962,338--.

Column 1, line 50, delete "and filed" and substitute --,--.

UNITED STATES PATENT AND TRADEMARK OFFICE
CERTIFICATE OF CORRECTION

PATENT NO. : 5,144,211

DATED : September 1, 1992

INVENTOR(S) : KENNETH E. DAGGETT et al.

It is certified that error appears in the above-identified patent and that said Letters Patent is hereby corrected as shown below:

Column 1, line 51, after "Casler" insert --, now U.S. Patent No. 4,851,748--.

Column 1, lines 53 and 54, delete "and filed" and substitute --,--.

Column 1, line 56, after "Johnson" insert --, now U.S. Patent No. 4,786,847--.

Column 1, line 58, delete "and filed" and substitute --,--.

Column 1, line 60, after "Casler" insert --, now U.S. Patent No. 4,908,556--.

Column 1, line 61, before "entitled" insert --, filed January 31, 1989--.

Column 1, line 64, after "NOISE," insert --by--.

Column 1, line 67, delete "now continuation" and substitute --continued as--.

Column 2, line 3, delete "and filed" and substitute --,--.

Column 2, line 4, after "Onaga" insert --, now U.S. Patent No. 4,864,204--.

Column 2, line 5, delete "now continuation" and substitute --continued as--.

UNITED STATES PATENT AND TRADEMARK OFFICE
CERTIFICATE OF CORRECTION

PATENT NO. :   5,144,211                              Sheet 4 of 6
DATED      :   September 1, 1992
INVENTOR(S):   KENNETH E. DAGGETT et al.

It is certified that error appears in the above-identified patent and that said Letters Patent is hereby corrected as shown below:

Column 2, line 9, delete "and filed" and substitute --,--.

Column 2, line 10, after "Booth" insert --, now U.S. Patent No. 4,868,474--.

Column 2, line 15, delete "and filed" and substitute --,--.

Column 2, line 16, after "Penkar" insert --, now U.S. Patent No. 4,829,219--.

Column 2, line 19, delete "and filed" and substitute --,--.

Column 2, line 20, after "Penkar" insert --, now U.S. Patent No. 4,774,445--.

Column 2, line 23, delete "and filed" and substitute --,--.

Column 2, line 24, after "Penkar" insert --, now U.S. Patent No. 4,772,831--.

Column 2, line 27, delete "and filed" and substitute --,--.

Column 2, line 27, after "Penkar" insert --, now U.S. Patent No. 4,773,025--.

Column 2, line 28, delete "now continuation" and substitute --continued as--.

UNITED STATES PATENT AND TRADEMARK OFFICE
CERTIFICATE OF CORRECTION

PATENT NO. : 5,144,211                          Sheet 5 of 6
DATED : September 1, 1992
INVENTOR(S) : KENNETH E. DAGGETT et al.

It is certified that error appears in the above-identified patent and that said Letters Patent is hereby corrected as shown below:

Column 2, line 33, delete "and filed" and substitute --,--.

Column 2, line 33, after "Onaga" insert --, now U.S. Patent No. 4,864,206--.

Column 2, line 37, delete "and filed" and substitute --,--.

Column 2, line 37, after "Onaga" insert --, now U.S. Patent No. 4,807,153--.

Column 3, line 66, delete "nd" and substitute --and--.

Column 4, lines 20 and 21, delete "the cross-referenced patent application" and substitute --U.S. Patent No. 4,902,944--.

Column 4, line 48, delete "patent applications" and substitute --patents--.

Column 6, lines 5 and 6, delete "patent applications" and substitute --U.S. Patent No. 4,894,598--.

Column 6, lines 22 and 23, delete "(see cross-referenced patent application Ser. No. 932,975)" and substitute --(see U.S. Patent No. 4,902,944)--.

Col. 6, lines 27-31, delete "another copending application entitled "Robot Control System Having Adaptive Feedforward Torque Control For Improved Accuracy", filed by Onaga et al. on Mar. 21, 1988, now"

UNITED STATES PATENT AND TRADEMARK OFFICE
CERTIFICATE OF CORRECTION

PATENT NO. : 5,144,211

DATED : September 1, 1992

INVENTOR(S) : KENNETH E. DAGGETT et al.

It is certified that error appears in the above-identified patent and that said Letters Patent is hereby corrected as shown below:

Column 8, lines 37-39, delete "the cross-referenced patent applications especially Ser. No. 06/932,841 and 06/304,975" and substitute --U.S. Patent Nos. 4,894,598 and 4,980,838--.

Column 9, lines 44-48, "delete "Ser. No. 932,974 entitled DIGITAL ROBOT CONTROL PROVIDING PULSE WIDTH MODULATION FOR A BRUSHLESS DC DRIVE, and filed by Kenneth E. Daggett et al. on Nov. 20, 1986" and substitute --U.S. Patent No. 4,874,997--.

Column 9, lines 64 and 65, delete "cross-referenced patent application 932,975" and substitute --U.S. Patent No. 4,902,944--.

Column 1, lines 12,20,29,47,52,57 and 68; and Column 2, lines 6,11,17,21,25,29 and 34, before "entitled" insert -- , --.

Signed and Sealed this

Eighteenth Day of January, 1994

Attest:

BRUCE LEHMAN

*Attesting Officer*     *Commissioner of Patents and Trademarks*